United States Patent
Liu et al.

(10) Patent No.: US 11,591,905 B2
(45) Date of Patent: Feb. 28, 2023

(54) METHODS AND SYSTEMS FOR DETERMINING OPTIMUM PRESSURE DRAWDOWN IN A PRODUCTION WELL FOR A SHALE GAS RESERVOIR

(71) Applicant: Saudi Arabian Oil Company, Dhahran (SA)

(72) Inventors: Hui-Hai Liu, Katy, TX (US); Yanhui Han, Houston, TX (US); Zhuang Sun, Austin, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 349 days.

(21) Appl. No.: 16/879,953

(22) Filed: May 21, 2020

(65) Prior Publication Data
US 2021/0363882 A1    Nov. 25, 2021

(51) Int. Cl.
*E21B 43/12* (2006.01)
*E21B 43/16* (2006.01)
(Continued)

(52) U.S. Cl.
CPC .......... *E21B 49/008* (2013.01); *E21B 43/121* (2013.01); *E21B 49/006* (2013.01);
(Continued)

(58) Field of Classification Search
CPC ........ E21B 43/00; E21B 43/12; E21B 43/121; E21B 43/16; E21B 49/00; E21B 49/006; E21B 49/008; E21B 49/02; E21B 47/00; G01N 7/10; G01N 15/08; G01N 15/0806; G01N 15/0826
See application file for complete search history.

(56) References Cited

U.S. PATENT DOCUMENTS

| | | | |
|---|---|---|---|
| 6,860,147 B2 | 3/2005 | Gunter et al. | |
| 7,066,019 B1 * | 6/2006 | Papanastasiou | E21B 49/006 |
| | | | 73/152.59 |

(Continued)

FOREIGN PATENT DOCUMENTS

| | | |
|---|---|---|
| CN | 103528934 A | 1/2014 |
| CN | 104834807 A | 8/2015 |

(Continued)

OTHER PUBLICATIONS

Itasca Consulting Group; "FLAC3D Fast Lagrangian Analysis of Continua in 3 Dimensions" FLAC3D Version 7.0, 2011; pp. 1-25.
(Continued)

*Primary Examiner* — Nguyen Q. Ha
(74) *Attorney, Agent, or Firm* — Bracewell LLP; Constance G. Rhebergen; Keith R. Derrington (57) ABSTRACT

Methods and systems for increasing normalized production rate of an oil and gas reservoir by optimizing a pressure drawdown of a subsurface formation are disclosed. The methods include determining permeability of the subsurface formation as a function of effective stresses, determining a stress sensitivity factor for the core sample, upscaling the sensitive stress factor, determining the optimum pressure drawdown for the subsurface formation, and controlling the pressure drawdown in a field operation such that it does not exceed the optimum pressure drawdown for the subsurface formation.

9 Claims, 4 Drawing Sheets

(51) Int. Cl.
*E21B 49/00* (2006.01)
*G01N 7/10* (2006.01)
*G01N 15/08* (2006.01)
*E21B 49/02* (2006.01)

(52) U.S. Cl.
CPC .......... *G01N 7/10* (2013.01); *G01N 15/0806* (2013.01); *G01N 15/0826* (2013.01); *E21B 49/02* (2013.01)

(56) References Cited

U.S. PATENT DOCUMENTS

| | | | |
|---|---|---|---|
| 10,428,631 B2* | 10/2019 | Noblett | E21B 33/129 |
| 10,571,605 B2* | 2/2020 | Crawford | E21B 43/26 |
| 11,346,197 B2* | 5/2022 | Stephenson | F04B 49/08 |
| 2014/0144330 A1 | 5/2014 | Huang | |
| 2019/0234859 A1 | 8/2019 | Chen et al. | |

FOREIGN PATENT DOCUMENTS

| | | |
|---|---|---|
| CN | 107389521 A | 11/2017 |
| CN | 109339774 A | 2/2019 |
| CN | 109490162 A | 3/2019 |
| RU | 2538563 C1 | 1/2015 |

OTHER PUBLICATIONS

Jones, S.C.; "A Technique for Faster Pulse-Decay Permeability Measurements in Tight Rocks" SPE 28450, SPE Formation Evaluation, Mar. 1997; pp. 19-25.

Liu, Hui Hai et al.; "On the relationship between effective permeability and stress for unconventional rocks: Analytical estimates from laboratory measurements" Journal of Natural Gas Science & Engineering 56 (2018); pp. 408-413.

Ozkan, E et al.; "Modeling of Fluid Transfer from Shale Matrix to Fracture Network" SPE 134830, SPE Annual Technical Conference and Exhibition Florence, Italy, Sep. 19-22, 2010; pp. 1-18.

Patzek, Tad W. et al.; "Gas production in the Barnett Shale obeys a simple scaling theory" PNAS, Dec. 3, 2013, vol. 110, No. 49; pp. 19731-19736.

Pruess, Karsten et al.; "TOUGH2 User's Guide, Version 2" Earth Sciences Division, Lawrence Berkeley National Laboratory, University of California, Berkeley, Nov. 1999; pp. 1-210.

Rutqvist, Jonny; "Status of the TOUGH-FLAC simulator and recent applications related to coupled fluid flow and crustal deformations" Computers & Geosciences 37 (2011); pp. 739-750.

International Search Report and Written Opinion for International Application No. PCT/US2021/070589; report dated Sep. 16, 2021; pp. 1-16.

Mirani, Ankit et al.; "Production-Pressure-Drawdown Management for Fractured Horizontal Wells in Shale-Gas Formations" SPE 181365, Aug. 2018 SPE Reservoir Evaluation & Engineering; pp. 550-565.

Sun, Zhuang et al.; "The optimum pressure drawdown for production from a shale gas reservoir A numerical study with a coupled geomechanics and reservoir model" Journal of Natural Gas Science and Engineering (88), 2021; pp. 1-9.

Wang, Junlei et al; "An Integrated Approach to Optimize Bottomhole-Pressure-Drawdown Management for a Hydraulically Fractured Well Using a Transient Inflow Performance Relationship" SPE 195688, Feb. 2020 SPE Reservoir Evaluation & Engineering; pp. 95-111.

* cited by examiner

METHODS AND SYSTEMS FOR DETERMINING OPTIMUM PRESSURE DRAWDOWN IN A PRODUCTION WELL FOR A SHALE GAS RESERVOIR

TECHNICAL FIELD

Example embodiments generally relate to the oil and gas industry. More specifically, embodiments relate to methods and systems for determining optimum pressure drawdown in a production well for a shale gas reservoir.

BACKGROUND

Pressure drawdown, which is defined as the difference between initial reservoir pore pressure and the fluid pressure in a production well, is a key parameter to control and optimize gas production from a shale gas reservoir. In general, a larger pressure drawdown is expected to give a larger production rate at a given production time because a larger pressure drawdown corresponds to a larger fluid pressure gradient between the reservoir and the production well, and thus a larger gas flow rate to the well. However, for stress-sensitive shale gas reservoirs, the relation between the pressure drawdown and gas production is not straightforward.

Fluid production causes a decrease in pore pressure and thus an increase in effective stress on the subsurface formation. The compacted reservoir can reduce the porosity and permeability, which tends to reduce the production rate. Thus, during production process in a stress-sensitive unconventional reservoir, there exists two competing mechanisms that are related to the pressure drawdown and impact the production; pressure gradient between the reservoir and production well, and stress dependency of permeability. The combination of the two mechanisms results in the potential existence of the optimum pressure drawdown corresponding to the highest production rate. Beyond an optimum pressure drawdown, the production rate decreases with further increasing pressure drawdown for a given reservoir. Therefore, it is important to understand the conditions for a controlled drawdown, and the conditions where the pressure drawdown does not exceed the optimum pressure drawdown. Thus, the determination of the optimum pressure drawdown is important for drawdown management in field operations. This disclosure develops a simple and practical method to estimate optimum pressure drawdown based on reservoir properties.

SUMMARY

Example embodiments disclosed provide a method for increasing normalized production rate of a reservoir by optimizing the pressure drawdown of the subsurface formation.

One example embodiment is a method for optimizing production of a hydrocarbon from a subsurface formation. The method includes acquiring a sample of the subsurface formation, positioning the sample in a pressure vessel comprising a fluid and a pressure gauge and applying a constant confining pressure, $P_c$, running a first test by equilibrating the sample at a predetermined first pore gas pressure, $p_i$ applying a predetermined constant second gas pressure, $p_o$, to an inlet of the sample, the second gas pressure being greater than the first pore gas pressure, measuring a third pore gas pressure, p, as a function of time, t, at a location along the axis of the sample in the pressure vessel, measuring permeability of the sample at a plurality of effective stresses, wherein each effective stress is the difference between the constant confining pressure and a pore pressure, and determining permeability of the sample as a function of effective stress using the formula:

$$\ln(k) = \ln(k_0) - \alpha \sigma_{eff}$$

where k is permeability at effective stress $\sigma_{eff}$, $k_0$ is the permeability at zero effective stress, and $\alpha$ is the stress sensitivity factor of the permeability for the sample.

The method may also include determining stress sensitivity factor based on the formula:

$$\alpha = -\frac{1}{k} \frac{dk}{d(\sigma_{eff})}$$

where 'k' is the permeability and '$\sigma_{eff}$' is the effective stress.

The method may also include upscaling the stress sensitivity factor ($\alpha$) determined for the core sample using the formula:

$$\alpha_{up} = \frac{1}{n} \sum_{i=1}^{n} \alpha_i$$

where n is the total number of rock samples that are collected from the reservoir under consideration and have measurement results for the stress sensitivity factor, and $\alpha_i$ is the stress sensitivity factor for the $i^{th}$ rock sample.

The method may also include determining the optimum pressure drawdown for the subsurface formation, $\Delta P_o$, using the formula $$\Delta P_o = \frac{9.0}{\alpha_{up}}$$

The method may also include controlling the pressure drawdown in a field operation such that it does not exceed $\Delta P_o$.

Another example embodiment is a non-transitory computer-readable medium having computer executable instructions that cause a computer to perform the operations of reading a measurement of a first pore gas pressure, $p_i$, of a gas after equilibrating the sample in a pressure vessel comprising a fluid and a pressure gauge that reads the constant confining pressure $P_c$ after it is applied, reading a measurement of a predetermined constant second gas pressure, $p_o$, applied to an inlet of the sample, the second gas pressure being greater than the first pore gas pressure, reading a measurement of a third pore gas pressure, p, at time, t, at a location along the axis of the sample in the pressure vessel, measuring permeability of the sample at a plurality of effective stresses, wherein each effective stress is the difference between the constant confining pressure and a pore pressure, and determining permeability of the sample as a function of effective stress using the formula:

$$\ln(k) = \ln(k_0) - \alpha \sigma_{eff}$$

where k is permeability at effective stress $\sigma_{eff}$, $k_0$ is the permeability at zero effective stress, and $\alpha$ is the stress sensitivity factor of the permeability for the sample.

The medium may also include computer executable instructions for determining stress sensitivity factor based on the formula:

$$\alpha = -\frac{1}{k}\frac{dk}{d(\sigma_{eff})}$$

where 'k' is the permeability and '$\sigma_{eff}$' is the effective stress.

The medium may also include computer executable instructions for upscaling the stress sensitivity factor ($\alpha$) permeability value determined for the core sample using the formula:

$$\alpha_{up} = \frac{1}{n}\sum_{i=1}^{n}\alpha_i$$

where n is the total number of rock samples that are collected from the reservoir under consideration and have measurement results for the stress sensitivity factor, and $\alpha_i$ is the stress sensitivity factor for the $i^{th}$ rock sample.

The medium may also include computer executable instructions for determining the optimum pressure drawdown for the subsurface formation, $\Delta P_o$, using the formula $$\Delta P_o = \frac{9.0}{\alpha_{up}}$$

The medium may also include computer executable instructions for controlling the pressure drawdown in a field operation such that it does not exceed $\Delta P_o$.

Another embodiment is a method for optimizing production of a hydrocarbon from a subsurface formation. The method includes measuring permeability of a sample of the subsurface formation at a plurality of effective stresses, wherein each effective stress is the difference between a constant confining pressure and a pore pressure; and determining permeability of the subsurface formation as a function of effective stresses using the formula:

$$\ln(k) = \ln(k_0) - \alpha\sigma_{eff}$$

where k is permeability at effective stress $\sigma_{eff}$, $k_0$ is the permeability at zero effective stress, and $\alpha$ is the stress sensitivity factor of the permeability for the sample.

The method may also include determining stress sensitivity factor based on the formula:

$$\alpha = -\frac{1}{k}\frac{dk}{d(\sigma_{eff})}$$

where 'k' is the permeability and '$\sigma_{eff}$' is the effective stress.

The method may also include upscaling the stress sensitivity factor ($\alpha$) determined for the core sample using the formula:

$$\alpha_{up} = \frac{1}{n}\sum_{i=1}^{n}\alpha_i$$

where n is the total number of rock samples that are collected from the reservoir under consideration and have measurement results for the stress sensitivity factor, and $\alpha_i$ is the stress sensitivity factor for the $i^{th}$ rock sample.

The method may also include determining the optimum pressure drawdown for the subsurface formation, $\Delta P_o$, using the formula $$\Delta P_o = \frac{9.0}{\alpha_{up}}$$

The method may also include controlling the pressure drawdown in a field operation such that it does not exceed $\Delta P_o$.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Advantages and features of the present disclosure and methods of accomplishing the same will be apparent by referring to embodiments described below in detail in connection with the accompanying drawings. The disclosed embodiments and configurations are not limited to the embodiments disclosed below and may be implemented in various different forms. The embodiments are provided only for completing the disclosure and for fully representing the scope of the disclosure to those skilled in the art.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the various example embodiments Pressure drawdown, which is defined as the difference between initial reservoir pore pressure and the fluid pressure in a production well, is a key parameter to control and optimize gas production from a shale gas reservoir. In general, a larger pressure drawdown is expected to give a larger production rate at a given production time because a larger pressure drawdown corresponds to a larger fluid pressure gradient between the reservoir and the production well, and thus a larger gas flow rate to the well. However, for stress-sensitive shale gas reservoirs, the relation between the pressure drawdown and gas production is not straightforward.

Figure 1:
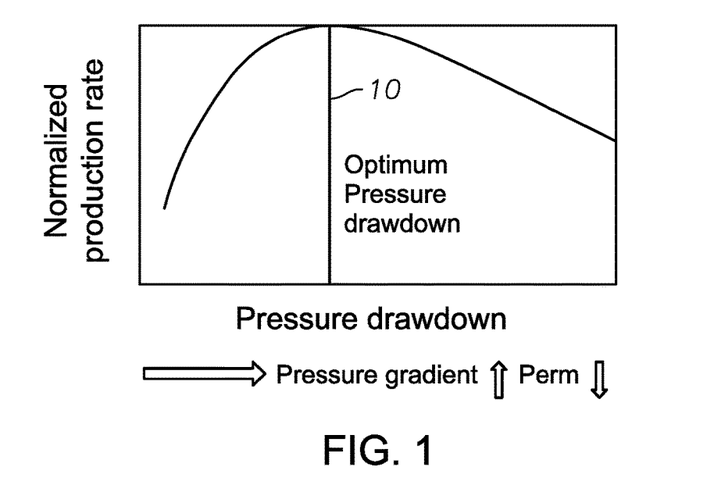
FIG. 1 is a graph illustrating the existence of optimum pressure drawdown in a stress-sensitive shale gas reservoir, according to one example embodiment of the disclosure.

Fluid production causes a decrease in pore pressure and thus an increase in effective stress on the subsurface formation. The compacted reservoir can reduce the porosity and permeability, which tends to reduce the production rate. Thus, during production process in a stress-sensitive unconventional reservoir, there exists two competing mechanisms that are related to the pressure drawdown and impact the production; pressure gradient between the reservoir and production well, and stress dependency of permeability. The combination of the two mechanisms results in the potential existence of the optimum pressure drawdown corresponding to the highest production rate, and the relationship is illustrated in FIG. 1, for example. As illustrated in this figure, beyond an optimum pressure drawdown 10, the production rate decreases with further increasing pressure drawdown for a given reservoir. Therefore, it is important to understand the conditions for a controlled drawdown, and the conditions where the pressure drawdown does not exceed the optimum pressure drawdown. Thus, the determination of the optimum pressure drawdown is important for drawdown management in field operations. Accordingly, one objective of the disclosure is to develop a simple and practical approach to estimate optimum pressure drawdown based on reservoir properties.

Analytical Method for Determining Optimum Pressure Drawdown in a Production Well for a Shale Gas Reservoir The following sections provide an example method for determining optimum pressure drawdown in a production well for a shale gas reservoir. The stress sensitivity of a shale gas reservoir can be characterized by the stress sensitivity factor of permeability '$\alpha$' as shown in Equation 1.

$$\alpha = -\frac{1}{k}\frac{dk}{d(\sigma_{eff})} \quad (1)$$

where 'k' is permeability and '$\sigma_{eff}$' is the effective stress. A larger '$\alpha$' value corresponds to a larger degree of sensitivity of permeability to the stress. Therefore, for a zero '$\alpha$' value, the permeability has nothing to do with the stress.

Based on a sensitivity study it was found that the optimum pressure drawdown, '$\Delta P_o$' is related to the stress sensitivity parameter of permeability as shown in Equation 2.

$$\Delta P_o = \frac{9.0}{\alpha} \quad (2)$$

The stress sensitivity parameter '$\alpha$' can be accurately measured for core samples in laboratory. However, because of the subsurface heterogeneity, for a shale gas reservoir, different rock core samples may have different '$\alpha$' values. These values can be upscaled to the reservoir scale in order to use Eq. (2). The upscaled stress sensitivity factor of permeability is shown to be the average of the core sample values. With the upscaled stress sensitivity factor, the optimum pressure drawdown can be determined using Eq. (2).

In field operations, the pressure drawdown should be controlled in such a way that the actual pressure drawdown does not exceed '$\Delta P_o$'. Further increasing the pressure drawdown in a production well beyond the optimum pressure drawdown would not increase the production and, instead, is subject to a risk to reservoir damage. The following section discussed the development of the relationship between the optimum pressure drawdown and the stress sensitivity factor shown in Eq. (2).

In a stress-sensitive reservoir, fluid flow and rock deformation are highly coupled. During the production, the reservoir pore pressure declines and then reservoir stress condition changes accordingly. The stress change impacts both reservoir permeability and porosity that determine fluid flow and also pore pressure. An accurate simulation of fluid flow in a stress-sensitive reservoir requires a coupled reservoir fluid flow and geomechanics model. In the following paragraphs, the modeling approach derived by linking two established codes TOUGH2 and FLAC3D is used. TOUGH2 is a numerical simulator for multiphase, multicomponent fluid flow and heat transfer, and FLAC3D is a commercial code designed for rock and soil mechanics. The coupled TOUGH2-FLAC3D simulator has been widely used in a number of areas including carbon dioxide geological sequestration, nuclear waste disposal, development of geothermal energy, and production from hydrate-bearing sediments.

Figure 2:
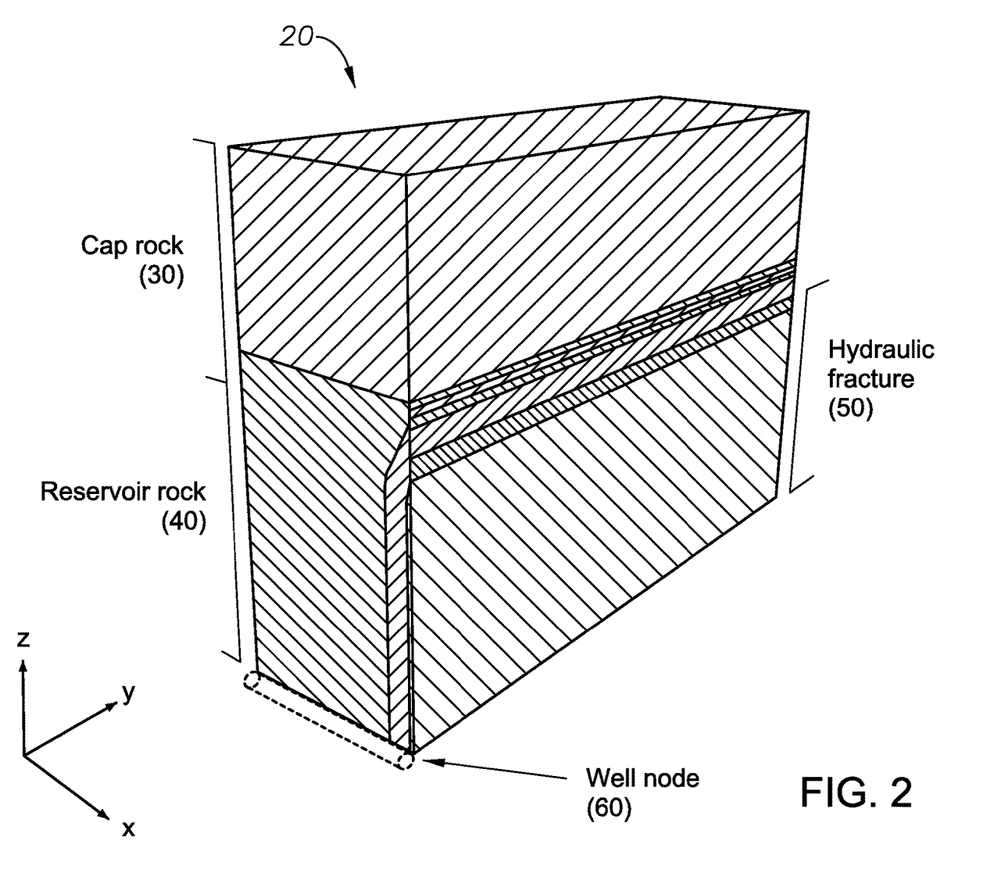
FIG. 2 illustrates numerical grids and a snapshot of the numerical simulation with color representing the reservoir pore pressure, according to one example embodiment of the disclosure.

One embodiment is directed to a method for determining the optimum pressure drawdown with the TOUGH2-FLAC3D simulator, as illustrated in FIG. 2, for example. In this example, the geometry of hydraulic fractures is often represented as identical and parallel vertical fractures. In FIG. 2, the top part 30 is the cap rock, which is assumed to be impermeable. The reservoir rock 40 has the same height as hydraulic fracture 50. Along the X direction, the domain size corresponds to half of the fracture spacing because of the symmetry resulting from the identical individual hydraulic fractures. It should also be noted that only half width of a hydraulic fracture is included here. As a result of the symmetry, a quarter of the domain involving fluid flow in the reservoir is used for the simulation on the Y-Z plane. The symmetry requires the insignificant effect of gravity on flow process in both the reservoir rock 40 and the hydraulic fracture 50. The fracture spacing can be set to be 60 feet, fracture height of 80 feet, fracture length of 100 feet, fracture width (aperture) of 0.01 feet, and a cap rock height of 30 feet. It should be noted here that these numbers are merely examples that may be typical values for unconventional reservoirs, and any number that may be suitable for the purpose may be used. Grids become finer along the positive X-direction and the hydraulic fracture is represented by the layer of finest grids. The well node 60 represents the intersection between horizontal wellbore and hydraulic fracture and is maintained at a constant pressure. Reservoir rock 40 and cap rock 30 have a Young's modulus of 40 GPa and a Poisson's ratio of 0.32. Cap rock 30 has zero porosity and permeability serving as a mechanical overburden. A constant overburden stress of 11600 psi is then applied on the top of the cap rock 30 and confines the displacement of other boundaries. Initially the horizontal stress is, for example, 10,000 psi and the pore pressure is, for example, 8,000 psi. Fluid flow has no-flow boundary conditions on all the sides of model domain shown in FIG. 2. The reservoir fluids are a gas phase methane and water at its residual saturation to approximately represent dry-gas reservoir conditions. Reservoir temperature is 280° F., a typical value for a shale formation buried at a depth of 10,000 feet, for example. The hydraulic properties of reservoir and fracture change with the stress state and follow exponential relationships with the normal effective stress, which can be given as follows:

$$\varnothing_r = \varnothing_{r0} e^{-c_{pr}\Delta\sigma_{z,eff}} \quad (3)$$

$$k_{x,r} = k_{x,r0} e^{-\alpha\Delta\sigma_{z,eff}} \quad (4)$$

$$k_{y,r} = k_{y,r0} e^{-\alpha\Delta\sigma_{z,eff}} \quad (5)$$

$$k_{z,r} = k_{z,r0} e^{-1/2\alpha(\Delta\sigma_{x,eff}+\Delta\sigma_{x,eff})} \quad (6)$$

$$\varnothing_f = \varnothing_{f0} e^{-c_{p,f}\Delta\sigma_{x,eff}} \quad (7)$$

$$k_f = k_{f0} e^{-\beta\Delta\sigma_{x,eff}} \quad (8)$$

where 'Ø' is porosity, 'k' is permeability, 'α' and 'β' are stress sensitivity factors of reservoir permeability and fracture permeability, respectively, '$C_p$' is pore compressibility, '$\Delta\sigma_{eff}$' is the increment of effective stress that is defined as the total stress minus pore pressure for a Biot coefficient of one. Subscripts 'r' and 'f' denote properties for reservoir and hydraulic fracture, respectively. Subscripts 'x', 'y', 'z', '0' denote X, Y, Z-directions, and initial condition, respectively. The stress sensitivity factor for fracture permeability '0' is given as $5\times10^{-4}$ psi$^{-1}$. The pore compressibility values for the reservoir and hydraulic fracture are given as $1.5\times10^{-4}$ and $2.5\times10^{-4}$ psi$^{-1}$, respectively. The properties at the zero stress state are set as $\varnothing_{f0}=1.0$, $k_{f0}=3,000$ D and $\varnothing_{r0}=0.1$. The reservoir is assumed transversely isotropic with a vertical to horizontal permeability ratio of 0.001. This disclosure focuses on the impact of reservoir properties on the optimum pressure drawdown, including the initial permeability $k_{r0}$ and the stress sensitivity factor α.

Figure 3:
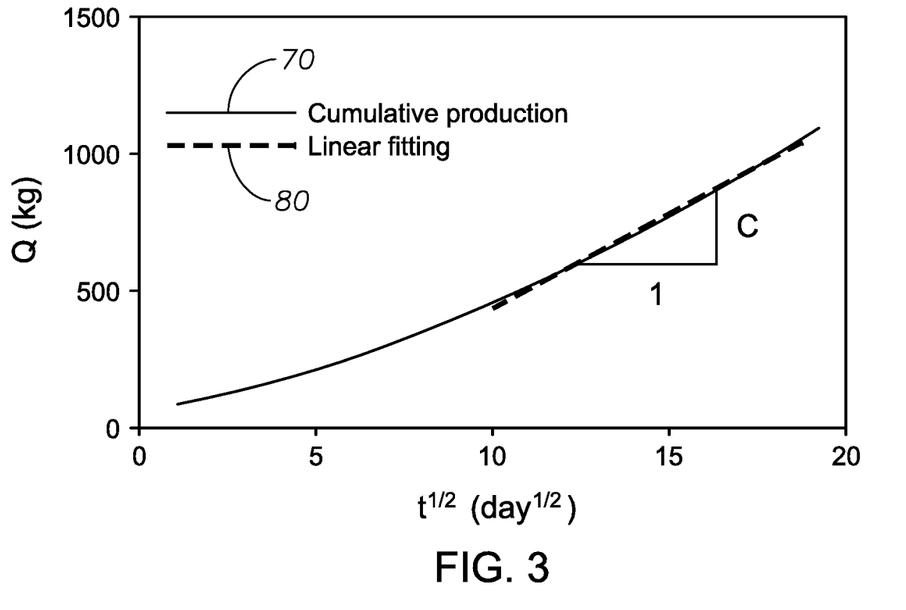
FIG. 3 is a graph illustrating cumulative production Q versus square root of time t, according to one example embodiment of the disclosure.

FIG. 3 shows cumulative production rate as a function of square root of production time for a constant pressure drawdown of 5,000 psi, an initial pore pressure of 8,000 psi, and a stress sensitivity factor α of 5×10-4 psi$^{-1}$. FIG. 3 illustrates two flow regimes 70, 80. The production rate is initially a nonlinear function of square root of time due to fracture fluid storage and the flow regime 70 only lasts for a short period of time. In the second flow regime 80, the relation between the cumulative production rate and square root of time becomes linear and can be expressed as:

$$Q = Ct^{1/2} \quad (9)$$

where parameter 'C' is the slope of the straight line as shown in FIG. 3.

The second flow regime 80 is called linear flow regime in which production is controlled by fluid flow from rock formation to hydraulic fractures. Many shale gas wells are produced in the linear flow regime for over 10 or 20 years, indicating that majority of shale gas may be recovered in the linear flow regime during the life time of a production well. Therefore, parameter 'C' can represent the production performance for these wells. FIG. 3 shows how to calculate the parameter 'C' from the change of cumulative production with time. The optimum pressure drawdown is defined for the linear flow regime. The optimum pressure drawdown herein corresponds to the highest production rate in the linear flow regime at a given production time. In this case, the optimum pressure drawdown can be determined based on the parameter 'C' defined in Eq. (9).

Figure 4:
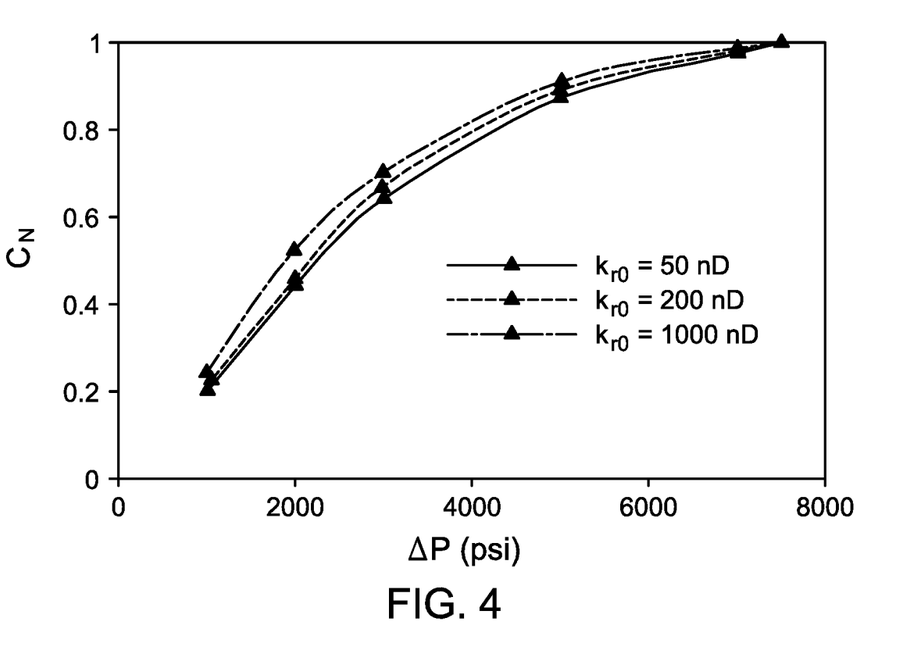
FIG. 4 is a graph illustrating the effect of initial reservoir permeability $k_{r0}$ on the production behavior, according to some example embodiments of the disclosure.

The next step is to investigate how the initial reservoir permeability $k_{r0}$ affects the production behavior. The example values for the initial reservoir permeability $k_{r0}$ used are 50 nD, 200 nD and 1,000 nD. Reservoirs with a high permeability exhibit a large production rate under both flow regimes. However, the change in permeability, as shown in FIG. 4, only shows a slight impact on the relative production behavior as indicated by the parameter $C_N$ that is the ratio of C value to the specific C value under the condition of 7,500 psi drawdown for a given permeability. The results indicate that the reservoir permeability should not affect determining the optimum pressure drawdown in practice due to the fact that the relation between the pressure drawdown and production exhibits a similar relative trend for a large range of permeability from 50 nD to 1,000 nD.

Since the optimum pressure drawdown is not sensitive to the reservoir permeability, we can then fix the initial reservoir permeability $k_{r0}$ as 200 nD and investigate the effect of stress sensitivity factor α. The stress sensitivity factor α represents the level of reservoir sensitivity to the change in stress state. A larger α corresponds to a more stress-sensitive formation. Experimental measurement indicates that for shale reservoirs the parameter α is often larger than $10^{-4}$ psi$^{-1}$.

Figure 5:
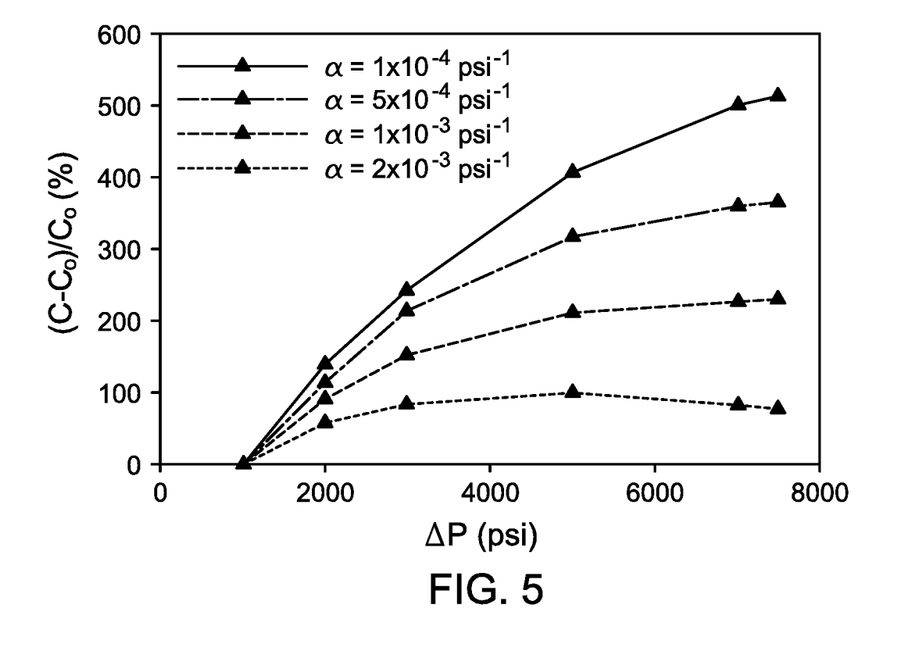
FIG. 5 is a graph illustrating the effect of the stress sensitivity factor $\alpha$ on the production behavior characterized by relative change in C, according to one example embodiment of the disclosure.

FIG. 5 shows the effect of stress sensitivity factor α on the relative changes in parameter C with respect to $C_0$ corresponding to the C value at the 1,000 psi drawdown. A large stress sensitivity factor α results in a small production rate due to the significant reduction in reservoir permeability. When α is smaller than $10^{-3}$ psi$^{-1}$, the production rate for the linear flow regime keeps increasing as the drawdown increases. However, when α is larger than $10^{-3}$ psi$^{-1}$, the optimum pressure drawdown exists and the production rate, or relative value of C, starts to decrease with further increase of the pressure drawdown beyond the optimum pressure drawdown.

Figure 6:
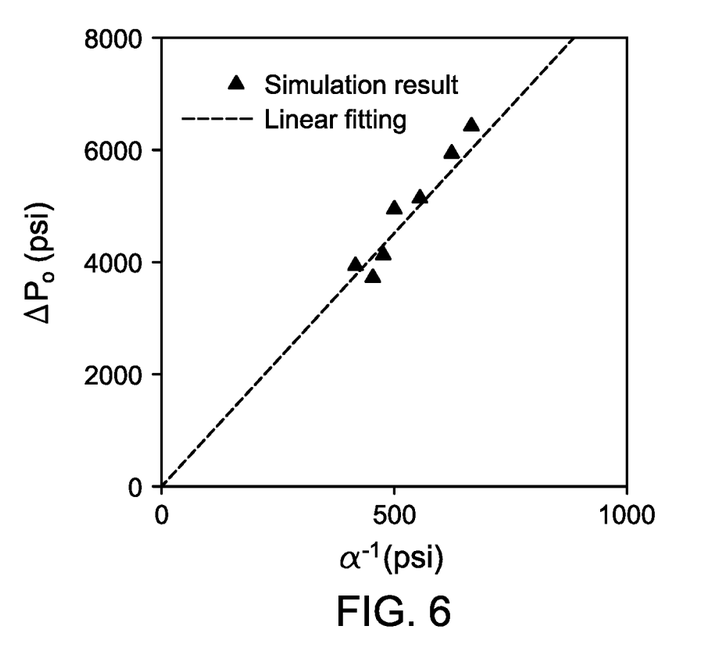
FIG. 6 is a graph illustrating optimum drawdown $\Delta P_o$ as a function of the stress sensitivity a based on numerical simulations, according to one example embodiment of the disclosure.

FIG. 5 indicates that a reservoir with a high level of stress sensitivity (large α) has the optimum drawdown which sets the upper limit of the drawdown for a better reservoir performance. Numerical simulations were performed based on various α and the optimum drawdown as a function of α−1 is plotted in FIG. 6. The linear fitting of numerical simulation results in FIG. 6 gives an expression for the optimum pressure drawdown $\Delta P_o$ as described by Eq. (2).

Example Method for Determining Optimum Pressure Drawdown in a Production Well for a Shale Gas Reservoir One embodiment is a method for determining optimum pressure drawdown in a production well for a shale gas reservoir. The method includes collecting rock core samples from the shale gas reservoir under consideration. Cylindrical core plugs can be obtained by drilling these core samples along the horizontal direction because the horizontal permeability determines hydrocarbon flow from the reservoir to the production wells. The core plugs are about 1 to 2 inches in diameter and 1 to 2 inches in length. All the surfaces of a plug are cleaned and rendered dust free to any avoid leakage in the subsequent steps.

In the next step, for each core plug, permeability values are measured in a laboratory for three or more effective stresses, which is defined as confining stress minus pore pressure. For example, the pressure pulse decay method may be used for the permeability measurements. The pulse-decay test setup generally consists of two gas reservoirs and a sample holder with controlled confining stress for test samples. Initially, the system is in equilibrium with a given gas pressure. A small pressure pulse is then introduced into the upstream gas reservoir, such that the pulse does not have a significant disturbance to the gas pressure in the system. The pore pressure in the core plug should be larger than 2,500 psi to eliminate the diffusion effects and pressure pulse is about 5% of the pore pressure. The pressures at the two gas reservoirs are monitored as a function of time. The pressure evolution results are used for determining the permeability of the core plug for the given pore pressure and confining stress. The permeability can be measured for the fixed pore pressure and different confining stresses. For each rock plug, the permeability measurements are organized as a function of the effective stresses. Then, the permeability measurements are fit with equation 10.

$$\ln(k)=\ln(k_0)-\alpha\sigma_{e\!f\!f} \qquad (10)$$

where k is permeability at effective stress $\sigma_{e\!f\!f}$, $k_0$ is the permeability at zero effective stress, and $\alpha$ is the stress sensitivity factor of the permeability for the rock sample. It should be noted here that that Eq. (10) is equivalent to Eq. (1).

In the next step, the stress sensitivity factor determined from the core samples is upscaled. For each formation, different rock plugs may give different $\alpha$ values. The upscaled factor $\alpha_{up}$ is calculated by averaging these $\alpha$ values.

$$\alpha_{up} = \frac{1}{n}\sum_{i=1}^{n}\alpha_i \qquad (11)$$

where n is the total number of rock samples that are collected from the reservoir under consideration and have measurement results for the stress sensitivity factor, and $\alpha_i$ is the stress sensitivity factor for the $i^{th}$ rock sample.

In the last step, the optimum pressure drawdown in the production well, $\Delta P_o$, is determined using the formula $$\Delta P_o = \frac{9.0}{\alpha_{up}} \qquad (12)$$

In the field operations, the pressure drawdown is controlled such that it does not exceed $\Delta P_o$. Further increasing the pressure drawdown in a production well beyond the optimum pressure drawdown would not increase the production and, instead, is subject to a risk of reservoir damage.

Computer Readable Medium

Figure 7:
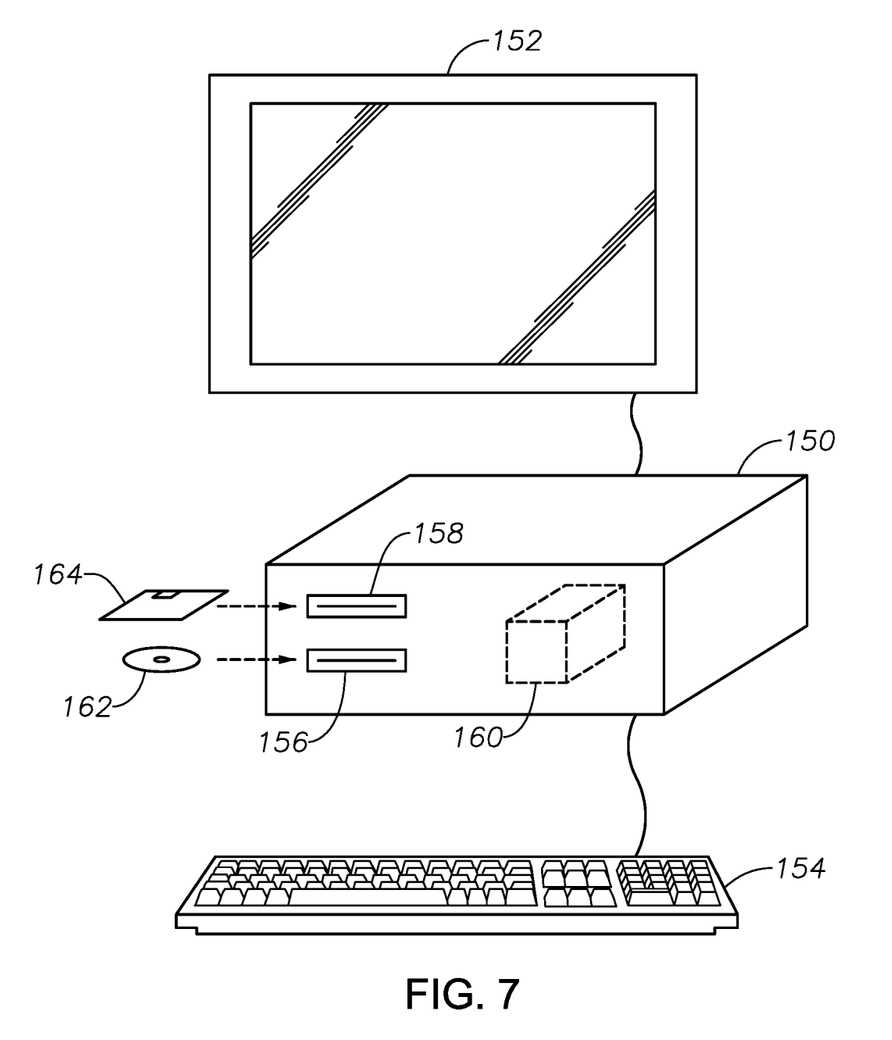
FIG. 7 shows a special purpose computer and various forms of computer readable media for optimizing pressure drawdown of a subsurface formation and increasing normalized production rate of the reservoir, according to some example embodiments of the disclosure.

Another example embodiment is a special purpose computer configured to execute specific computer instructions in a computer program stored in computer readable media. Referring to FIG. 7, the foregoing process as explained with reference to FIGS. 1-6 can be embodied in computer-readable code. The code can be stored on, for example, a computer readable medium, such as a floppy disk 164 which may be read by a disk drive 158, CD-ROM 162, which may be read by a disk drive 156, or a magnetic (or other type) hard drive 160 forming part of a general purpose programmable computer. The computer, as known in the art, includes a central processing unit 150, a user input device such as a keyboard 154 and a user display 152 such as a flat panel display or cathode ray tube display. According to this aspect, the computer readable medium includes logic operable to cause the computer to execute acts as set forth previously and explained with respect to the previous figures. The non-transitory computer-readable medium having computer executable instructions cause a computer to perform the operations of collecting rock core samples from the shale gas reservoir under consideration. Cylindrical core plugs can be obtained by drilling these core samples along the horizontal direction because the horizontal permeability determines hydrocarbon flow from the reservoir to the production wells. The core plugs are about 1 to 2 inches in diameter and 1 to 2 inches in length. All the surfaces of a plug are cleaned and rendered dust free to any avoid leakage in the subsequent steps.

In the next step, for each core plug, permeability values are measured in a laboratory for three or more effective stresses, which is defined as confining stress minus pore pressure. For example, the pressure pulse decay method may be used for the permeability measurements. The pulse-decay test setup generally consists of two gas reservoirs and a sample holder with controlled confining stress for test samples. Initially, the system is in equilibrium with a given gas pressure. A small pressure pulse is then introduced into the upstream gas reservoir, such that the pulse does not have a significant disturbance to the gas pressure in the system. The pore pressure in the core plug should be larger than 2,500 psi to eliminate the diffusion effects and pressure pulse is about 5% of the pore pressure. The pressures at the two gas reservoirs are monitored as a function of time. The pressure evolution results are used for determining the permeability of the core plug for the given pore pressure and confining stress. The permeability can be measured for the fixed pore pressure and different confining stresses. For each rock plug, the permeability measurements are organized as a function of the effective stresses. Then, the permeability measurements are fit with equation 10.

$$\ln(k)=\ln(k_0)-\alpha\sigma_{e\!f\!f} \qquad (10)$$

where k is permeability at effective stress $\sigma_{e\!f\!f}$, $k_0$ is the permeability at zero effective stress, and $\alpha$ is the stress sensitivity factor of the permeability for the rock sample. It should be noted here that that Eq. (10) is equivalent to Eq. (1).

In the next step, the stress sensitivity factor determined from the core samples is upscaled. For each formation, different rock plugs may give different $\alpha$ values. The upscaled factor $\alpha_{up}$ is calculated by averaging these $\alpha$ values.

$$\alpha_{up} = \frac{1}{n}\sum_{i=1}^{n}\alpha_i \qquad (11)$$

where n is the total number of rock samples that are collected from the reservoir under consideration and have measurement results for the stress sensitivity factor, and $\alpha_i$ is the stress sensitivity factor for the $i^{th}$ rock sample.

In the last step, the optimum pressure drawdown in the production well, $\Delta P_o$, is determined using the formula $$\Delta P_o = \frac{9.0}{\alpha_{up}} \qquad (12)$$

In the field operations, the pressure drawdown is controlled such that it does not exceed $\Delta P_o$. Further increasing the pressure drawdown in a production well beyond the optimum pressure drawdown would not increase the production and, instead, is subject to a risk of reservoir damage.

Therefore, example methods and systems disclosed here include conducting three or more pressure-dependent permeability tests having different effective stresses (confining stress minus pore pressure) and multiple different values of pore pressure. The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A method for optimizing production of a hydrocarbon from a subsurface formation, the method comprising:
   acquiring a sample of the subsurface formation;
   positioning the sample in a pressure vessel comprising a fluid and a pressure gauge and applying a constant confining pressure, $P_c$;
   running a first test by equilibrating the sample at a predetermined first pore gas pressure, $p_i$;
   applying a predetermined constant second pore gas pressure, $p_0$, to an inlet of the sample, the second pore gas pressure being greater than the first pore gas pressure;
   measuring a third pore gas pressure, p, as a function of time, t, at a location along the axis of the sample in the pressure vessel;
   measuring permeability of the sample at a plurality of effective stresses, wherein each effective stress is the difference between the constant confining pressure and a pore gas pressure;
   determining permeability of the sample as a function of effective stress using the formula:

$$\ln(k) = \ln(k_0) - \alpha \sigma_{eff}$$

where k is permeability at effective stress $\sigma_{eff}$, $k_0$ is the permeability at zero effective stress, and $\alpha$ is the stress sensitivity factor of the permeability for the sample;
   determining stress sensitivity factor based on the formula:

$$\alpha = -\frac{1}{k} \frac{dk}{d(\sigma_{eff})}$$

where k is the permeability and $\sigma_{eff}$ is the effective stress;
   upscaling the stress sensitivity factor determined for the core sample using the formula:

$$\alpha_{up} = \frac{1}{n} \sum_{i=1}^{n} \alpha_i$$

where n is the total number of rock samples that are collected from the reservoir under consideration and have measurement results for the stress sensitivity factor, and $\alpha_i$ is the stress sensitivity factor for the $i^{th}$ rock sample;
   determining the optimum pressure drawdown for the subsurface formation, $\Delta P_o$, using the formula:

$$\Delta P_o = \frac{9.0}{\alpha_{up}}$$

and
   controlling the pressure drawdown in a field operation such that it does not exceed $\Delta P_o$.

2. The method of claim 1, wherein the sample is about 1 to 2 inches in diameter and 1 to 2 inches in length.

3. The method of claim 1, wherein the first pore gas pressure in the sample is greater than 2,500 psi, and the second pore gas pressure is about 5% greater then the first pore gas pressure.

4. The method of claim 1, wherein the subsurface formation comprises at least one of shale, limestone, and sandstone.

5. A non-transitory computer-readable medium having computer executable instructions that cause a computer to perform the operations of:
   reading a measurement of a first pore gas pressure, $p_i$, of a gas after equilibrating a sample in a pressure vessel comprising a fluid and a pressure gauge that reads a constant confining pressure $P_c$ after it is applied;
   reading a measurement of a predetermined constant second pore gas pressure, $p_0$, applied to an inlet of the sample, the second pore gas pressure being greater than the first pore gas pressure;
   reading a measurement of a third pore gas pressure, p, at time, t, at a location along the axis of the sample in the pressure vessel;

measuring permeability of the sample at a plurality of effective stresses, wherein each effective stress is the difference between the constant confining pressure and a pore gas pressure;

determining permeability of the sample as a function of effective stress using the formula:

$$\ln(k) = \ln(k_0) - \alpha \sigma_{\mathit{eff}}$$

where k is permeability at effective stress $\sigma_{\mathit{eff}}$, $k_0$ is the permeability at zero effective stress, and $\alpha$ is the stress sensitivity factor of the permeability for the sample;

determining stress sensitivity factor based on the formula:

$$\alpha = -\frac{1}{k}\frac{dk}{d(\sigma_{\mathit{eff}})}$$

where k is the permeability and $\sigma_{\mathit{eff}}$ is the effective stress;

upscaling the stress sensitivity factor determined for the core sample using the formula:

$$\alpha_{up} = \frac{1}{n}\sum_{i=1}^{n}\alpha_i$$

where n is the total number of rock samples that are collected from the reservoir under consideration and have measurement results for the stress sensitivity factor, and $\alpha_i$ is the stress sensitivity factor for the $i^{th}$ rock sample;

determining the optimum pressure drawdown for the subsurface formation, $\Delta P_o$, using the formula:

$$\Delta P_o = \frac{9.0}{\alpha_{up}}$$

and controlling the pressure drawdown in a field operation such that it does not exceed $\Delta P_o$.

6. The medium of claim 5, wherein the sample is about 1 to 2 inches in diameter and 1 to 2 inches in length.

7. The medium of claim 5, wherein the first pore gas pressure in the sample is greater than 2,500 psi, and the second pore gas pressure is about 5% greater then the first pore gas pressure.

8. The medium of claim 5, wherein the subsurface formation comprises at least one of shale, limestone, and sandstone.

9. A method for optimizing production of a hydrocarbon from a subsurface formation, the method comprising:

measuring permeability of a sample of the subsurface formation at a plurality of effective stresses, wherein each effective stress is the difference between a constant confining pressure and a pore gas pressure; and determining permeability of the sample as a function of effective stress using the formula:

$$\ln(k) = \ln(k_0) - \alpha \sigma_{\mathit{eff}}$$

where k is permeability at effective stress $\sigma_{\mathit{eff}}$, $k_0$ is the permeability at zero effective stress, and $\alpha$ is the stress sensitivity factor of the permeability for the sample;

determining stress sensitivity factor based on the formula:

$$\alpha = -\frac{1}{k}\frac{dk}{d(\sigma_{\mathit{eff}})}$$

where k is the permeability and $\sigma_{\mathit{eff}}$ is the effective stress;

upscaling the stress sensitivity factor determined for the core sample using the formula:

$$\alpha_{up} = \frac{1}{n}\sum_{i=1}^{n}\alpha_i$$

where n is the total number of rock samples that are collected from the reservoir under consideration and have measurement results for the stress sensitivity factor, and $\alpha_i$ is the stress sensitivity factor for the $i^{th}$ rock sample;

determining the optimum pressure drawdown for the subsurface formation, $\Delta P_o$, using the formula:

$$\Delta P_o = \frac{9.0}{\alpha_{up}}$$

and controlling the pressure drawdown in a field operation such that it does not exceed $\Delta P_o$.

* * * * *

UNITED STATES PATENT AND TRADEMARK OFFICE
CERTIFICATE OF CORRECTION

| | |
|---|---|
| PATENT NO. | : 11,591,905 B2 |
| APPLICATION NO. | : 16/879953 |
| DATED | : February 28, 2023 |
| INVENTOR(S) | : Hui-Hai Liu, Yanhui Han and Zhuang Sun |

It is certified that error appears in the above-identified patent and that said Letters Patent is hereby corrected as shown below:

In the Claims

Column 12, Claim 3, Line 49 should read:
-- second pore gas pressure is about 5% greater than the first --

Column 13, Claim 7, Line 45 should read:
-- second pore gas pressure is about 5% greater than the first --

Signed and Sealed this
Ninth Day of May, 2023

Katherine Kelly Vidal
*Director of the United States Patent and Trademark Office*